United States Patent
Shridhar et al.

(10) Patent No.: US 7,944,998 B2
(45) Date of Patent: May 17, 2011

(54) AUDIO CORRELATION SYSTEM FOR HIGH DEFINITION RADIO BLENDING

(75) Inventors: Vasant Shridhar, Bloomfield, MI (US); Mark Spellman, Novi, MI (US); Nicolai Pavlov, Commerce, MI (US)

(73) Assignee: Harman International Industries, Incorporated, Northridge, CA (US)

( * ) Notice: Subject to any disclaimer, the term of this patent is extended or adjusted under 35 U.S.C. 154(b) by 1246 days.

(21) Appl. No.: 11/583,966

(22) Filed: Oct. 18, 2006

(65) Prior Publication Data

US 2007/0293167 A1 Dec. 20, 2007

Related U.S. Application Data

(63) Continuation-in-part of application No. 11/454,997, filed on Jun. 16, 2006.

(51) Int. Cl.
*H03D 1/24* (2006.01)
*G06F 3/033* (2006.01)

(52) U.S. Cl. ......... 375/320; 455/130; 375/259
(58) Field of Classification Search .......... 455/130; 375/320, 316, 259
See application file for complete search history.

(56) References Cited

U.S. PATENT DOCUMENTS

| 4,491,975 | A * | 1/1985 | Ito ................ 455/166.1 |
| 7,546,088 | B2 * | 6/2009 | Kroeger et al. ............ 455/60 |
| 2001/0005402 | A1 * | 6/2001 | Nagatani et al. .......... 375/296 |
| 2004/0043730 | A1 * | 3/2004 | Schill et al. .............. 455/130 |
| 2004/0235440 | A1 | 11/2004 | Toporski et al. ......... 455/150.1 |
| 2004/0261132 | A1 * | 12/2004 | Shimizu ................... 725/139 |
| 2006/0019601 | A1 * | 1/2006 | Kroeger et al. ........... 455/3.06 |
| 2006/0135098 | A1 * | 6/2006 | Yarosz et al. ............. 455/161.2 |
| 2006/0227814 | A1 * | 10/2006 | Iannuzzelli et al. ........ 370/516 |
| 2007/0086550 | A1 * | 4/2007 | Kaise ..................... 375/348 |
| 2007/0291876 | A1 | 12/2007 | Shridhar et al. ........... 455/130 |

* cited by examiner

*Primary Examiner* — Dac V Ha
*Assistant Examiner* — Brian J Stevens
(74) *Attorney, Agent, or Firm* — Brinks Hofer Gilson & Lione

(57) ABSTRACT

A system that blends a hybrid radio signal may provide reduced audio content skipping and may determine an audio correlation between analog and digital signal components in the hybrid radio signal before blending from the analog signal component to the digital signal component. The system may reduce volume level transitions during blending by adjustment of blend and cross-fade variables, as well as setting a hysteresis mode to prevent undesirable sequential jumping from digital mode back to analog mode. The system also may compensate for digital AM frequency quality issues by adjustment of a filter bandwidth when the receiver blends an AM signal from analog to digital mode.

35 Claims, 8 Drawing Sheets

AUDIO CORRELATION SYSTEM FOR HIGH DEFINITION RADIO BLENDING

PRIORITY CLAIM

This application is a continuation-in-part of U.S. patent application Ser. No. 11/454,997, "System for High Definition Radio Blending," filed Jun. 16, 2006, the contents of which are incorporated by reference herein.

BACKGROUND OF THE INVENTION

1. Technical Field

This invention relates to radio spectrum blending. In particular, this invention relates to high definition (HD) radio blending.

2. Related Art

Digital information may be transmitted using frequency division multiplexing (FDM). FDM is a modulation method that has been used in a number of different digital television and radio systems, including digital video broadcasting for television (DVB-T). In a hybrid mode of high definition (HD) radio, the amplitude modulation (AM) version may carry 36 kilobits per second of data for the main audio channel, while frequency modulation (FM) stations may carry information at 96 kbit/s. HD radio may also be used to carry multiple distinct audio services, called multicasting. Secondary channels, such as for weather, traffic, or a radio reading service, may be added this way, though it may reduce the audio quality of all channels on a station. Datacasting is also possible, and radio data system (RDS)-like metadata about the program and station may be included in the standard signal.

A limitation of HD radio is the blending process. In hybrid mode, a radio may lock onto an analog signal first, then try to find a better quality digital signal. If the digital signal is lost, the receiver may blend to analog. Much of the success of this blending relies on proper synchronization of the analog and digital audio signals by the broadcaster at the transmitter. This fallback process may also be impeded by the use of multiple channels.

Another limitation of conventional HD radio blending is the switching back and forth between an analog and a digital signal, which may result in sudden loudness changes perceived by the listener. If the listener is passing through a region of varying digital signal strength, this change may occur often, resulting in a decreased audio experience. For an AM HD radio signal, the blend from analog to digital may also result in an expansion of frequency content in the received signal. This change in frequency response may result in an uneven quality signal perceived by the listener.

Yet another limitation involves switching between a digital signal and an analog signal when the digital and analog signal are uncorrelated in time. Many stations switch off a delay in the analog signal during ball games. A user may perceive skipping over portions of audio content, or a repeat of audio content when the digital and analog components are uncorrelated. Therefore a need exists for an HD radio blending algorithm that reduces analog-digital switching drawbacks.

SUMMARY

A tuning system for blending an FM hybrid digital radio signal may reduce loudness variations due to blending from analog to digital signals received within a hybrid radio signal. The tuning system may lock onto an analog component of the radio signal. The tuning system may initialize blend variables and attempt to acquire a digital component of the radio signal. The tuning system may perform a signal correlation in the time domain between the analog component of the radio signal and the digital component of the radio signal, and may blend from the analog component to the digital component if the signal components are substantially correlated. If the digital component is present in the hybrid radio signal, the tuning system may adjust blend variables based on quality parameters and the correlation between the analog and digital signal components.

A tuning system that blends an AM hybrid digital radio signal may provide a loudness transition reduction along with an enhanced bandwidth adjustment during blending from analog to digital signals included in a hybrid radio signal. The tuning system may initialize blend variables and attempt to acquire a digital component of the radio signal. The tuning system may perform a signal correlation in the time domain between the analog component of the radio signal and the digital component of the radio signal, and may blend from the analog component to the digital component if the signal components are substantially correlated. The tuning system may adjust a filter bandwidth from an analog bandwidth to a digital bandwidth, as the bandwidth in an AM hybrid digital signal increases in the blend from analog to digital mode. The tuning system may process the digital signal component based on quality parameters and the correlation between the analog and digital signal components.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Figure 1:
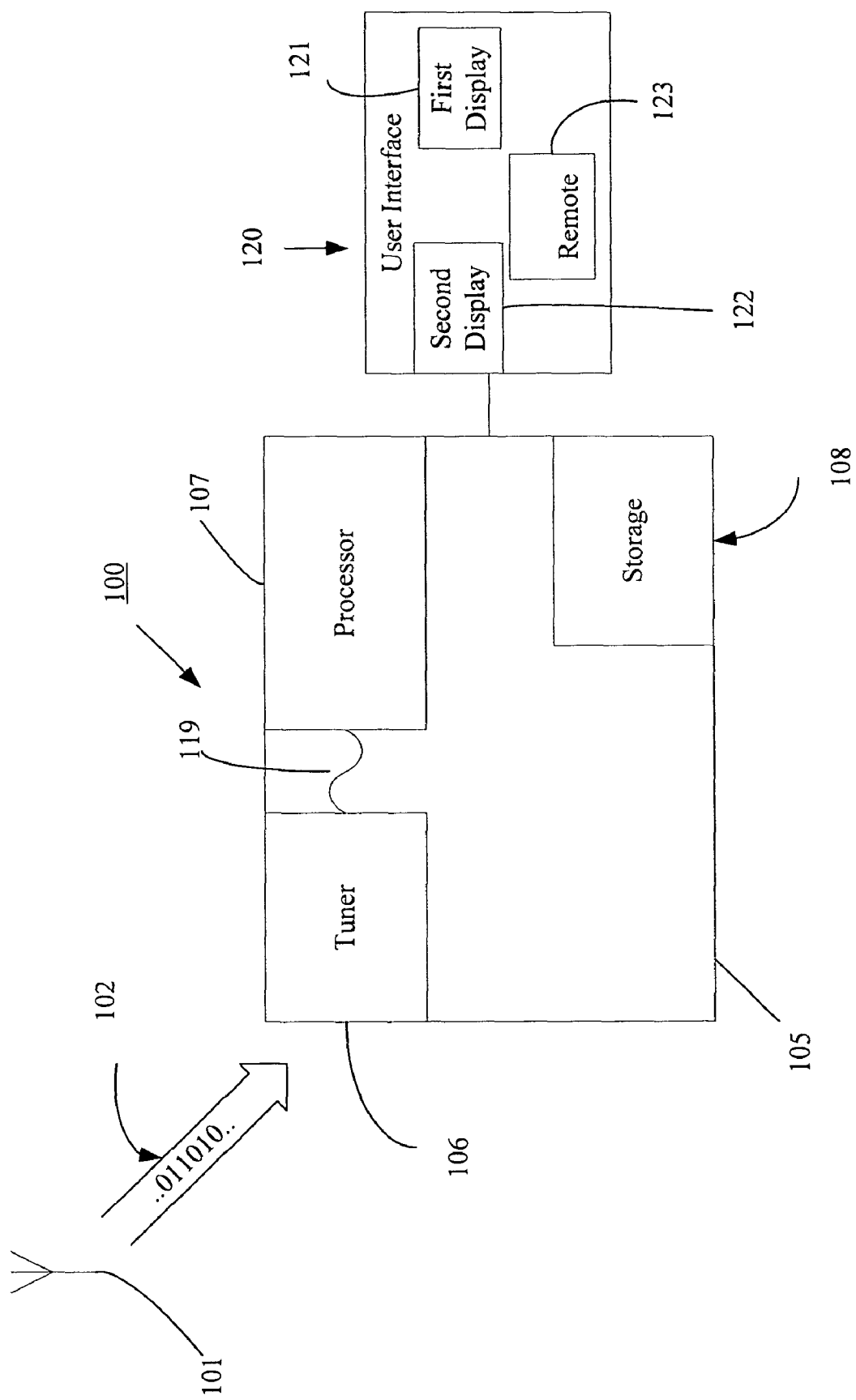
FIG. 1 is a block diagram of an example high definition radio system that includes a receiver.

A system that blends HD radio may provide improved sound quality perceived by the listener for AM and FM HD radio signals by determining an audio correlation between an analog signal component and a digital signal component of the HD radio signals. The system may limit the blending instances for uncorrelated signal components to minimize skipping or repetition of signal content.

An HD radio AM in-band, on-channel (IBOC) system may support transmission of digital audio and auxiliary digital data within an existing AM channel allocation by placing groups of digitally modulated carrier signals, within and/or adjacent to an analog AM signal. Because digitally modulated carriers may be inserted within the same spectrum occupied by the analog AM signal, the AM IBOC system may not be compatible with analog AM stereo signals. Corresponding sideband groups on either side of the carrier (i.e., upper primary and lower primary) may be independent in that only one of them may be needed for an IBOC receiver to be able to generate digital audio. However, to generate stereo (or enhanced fidelity) digital audio, the secondary and tertiary sideband groups may be needed.

Orthogonal frequency division multiplexing (OFDM) modulation may be used in the AM IBOC system. The digital audio modulated onto OFDM carriers may be perceptually coded, and may allow for high-quality digital audio using a relatively low bit rate. At the transmission site, an audio coder may create two audio streams: a "core" stream and an "enhanced" stream. The system may assign the streams to different parts of the spectrum. The core stream may carry monaural audio and the enhanced stream, at the broadcaster's option, may carry enhanced fidelity stereo audio.

The audio bandwidth for the digital audio may be approximately 15 kHz. The AM IBOC signal may incorporate a delay, such as a 4.5 second delay, between the analog and digital (simulcast) audio signals. This delay may be known as a "ballpark" mode transmission. The delay may improve performance in the presence of certain types of interference, which may affect how broadcasters monitor off-air signals.

An HD radio FM IBOC system may support transmission of digital audio and auxiliary digital data within an existing FM channel allocation by placing two or more groups of digitally modulated carrier signals adjacent to an analog FM signal. These sideband groups may be independent in that only one group may be needed for an IBOC receiver to be able to generate digital audio. Orthogonal frequency division multiplexing (OFDM) modulation may be utilized. The digital audio modulated onto OFDM carriers may be perceptually coded, allowing for high-quality digital audio using a relatively low bit rate. The system may incorporate a delay, such as a 4.5 second delay, between the analog and digital (simulcast) audio signals. The delay may improve performance in the presence of certain types of interference, which may affect how broadcasters monitor off-air signals. Equipment mismatch or poor calibration may also lead to a time delay between the HD radio signal components.

FIG. 1 illustrates an example HD radio system 100. A transmitter 101 may transmit a radio signal, such as an HD radio signal 102. The HD radio signal 102 may include both an analog radio signal and a digital radio signal. The HD radio signal 102 may be amplitude modulated (AM) or frequency modulated (FM). The HD radio system 100 includes a receiver 105 that may be configured to receive analog and digital AM and FM radio signals. The receiver 105 may be further configured to receive HD radio AM and FM radio signals, such as the HD radio signal 102, broadcast over a medium, such as over-the-air broadcast. The receiver 105 may further include a tuner module 106 that decodes and/or processes the received radio signals. The receiver 105 may also include an HD radio processor 107 that may process the received HD radio signals. The transmitter 101 may include a terrestrial ground antenna, a balloon-mounted or a dirigible-mounted antenna, or other aerial mounted antenna.

The receiver 105 may transmit a signal 119 to the radio processor 107 including data associated with blend timing or levels. For example, the signal 119 may include a blend line provided by the receiver 105, indicating a high to low blend transition. The blend line may specify the volume levels that the audio signal components transition between and/or the time period over which the blending may occur. The blend line may also specify when to perform a blend operation. The signal 119 may be propagated along a wired connection or a wireless connection.

The HD radio system 100 may include a user interface 120, coupled with the receiver 105. The user interface 120 may include a first display 121, a second display 122, and a remote interface 123. The first display 121 may include one or more indicators, such as a light emitting diode (LED), and/or the second display 122 may include a graphical user interface such as a liquid crystal display (LCD). The first display 121 and the second display 122 may provide information to a user about the HD radio system 100, such as channel tuning, volume, radio signal information (for example, song title, source location, genre, artist, album, time remaining in song, or other song information), and signal strength. Other display technologies, such as field emission displays, plasma displays, and cathode ray tube displays may be implemented. The remote interface 123 may comprise a touch screen, touch pad, capacitance detection device, button panel, wired interface, an infrared (IR) or a Bluetooth interface, and/or a haptic interface. The remote interface 123 may allow a user to interact with the HD radio system 100, such as to change a channel or a volume, select information to display, and/or to configure parameters and/or options of the HD radio system 100.

The receiver 105 may also include a storage 108 or memory device that may store buffered radio signals from the HD radio signal 102. The buffered radio signals may be processed by the processor 107 for later output, processing, or transmission to other modules within the HD radio system 100 or external to the HD radio system 100. Alternatively, the receiver 105, the processor 107, and the storage 108 may be implemented as separate modules. The storage 108 may include volatile storage such as dynamic random access memory (DRAM), static random access memory (SRAM), non-volatile memory such as flash memory and electronically eraseable memory (EEPROM), solid-state memory such as a hard disk drive, and/or disc-based media such as compact disc (CD), digital versatile disc (DVD), and/or floppy disk. The components (106, 107, and 108) illustrated in FIG. 1 may be integrated into a single unit, or may function as separate components within the receiver 105.

Figure 2:
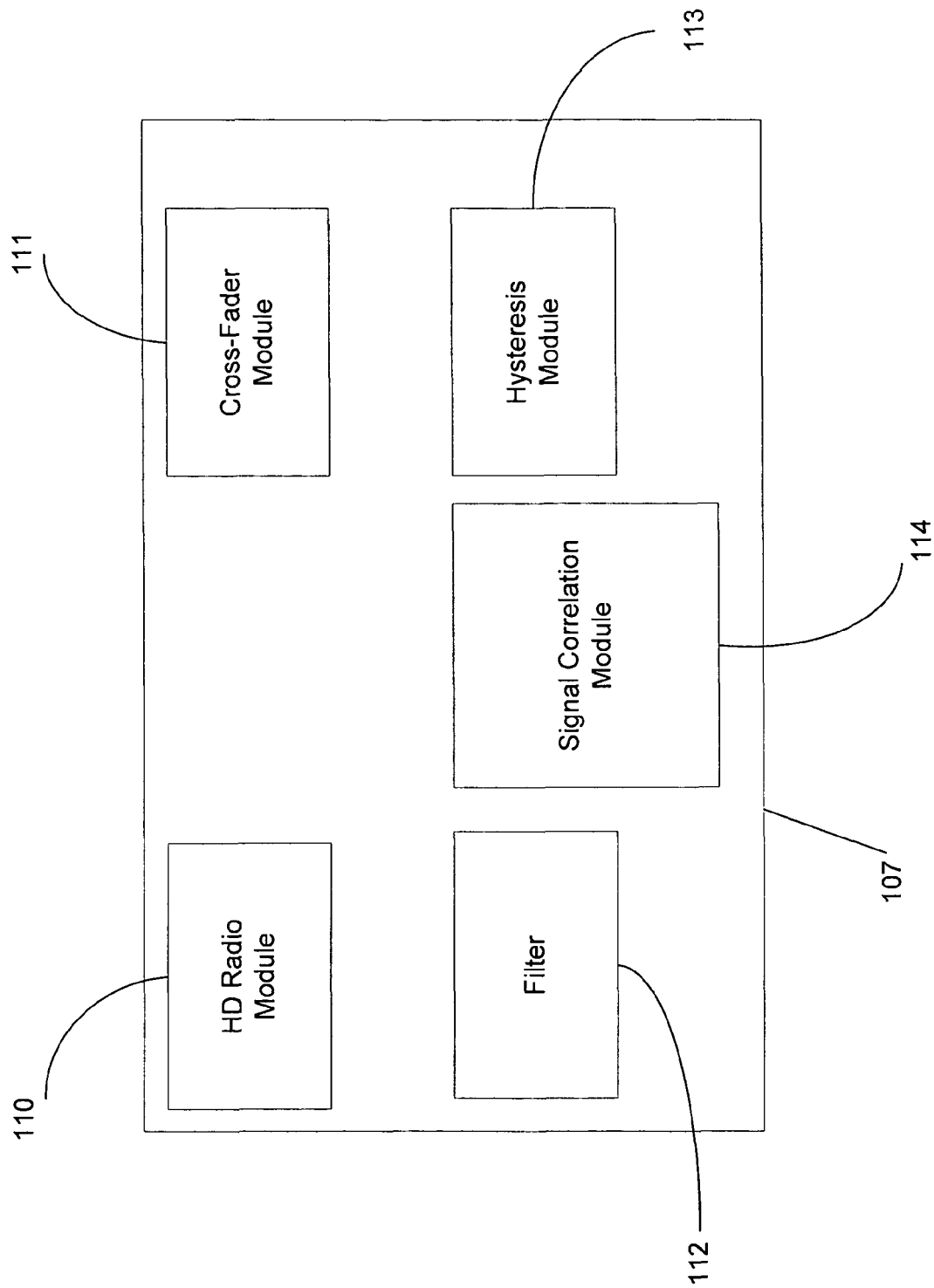
FIG. 2 is a block diagram of an example high definition radio processor included in the receiver of FIG. 1.

FIG. 2 is an example block diagram of the HD radio processor 107. The HD radio processor 107 may include an HD radio module 110, a cross-fader module 111, a filter bank 112, a hysteresis module 113, and a signal correlation module 114. The HD radio module 110 may process digital information contained in the sidebands of the HD radio signal 102 to determine signal characteristics, such as frequency properties, digital signal presence in the HD radio signal 102, or other signal parameters. The HD radio module 110 may comprise a processor, such as a digital signal processor (DSP), for example. The processor 107 may comprise a microprocessor, a DSP, a microcontroller, a discrete integrated circuit, a network appliance, and/or a network server, an ASIC, an FPGA, a custom integrated circuit, or other electronic circuit device.

The cross-fader module 111 may blend an analog signal to a digital signal, and blend or switch back a digital signal to an analog signal. The blending process may include diminishing the analog/digital signal output to a loudspeaker while increasing the respective digital/analog signal output to the loudspeaker smoothly at the same time. A listener may perceive little change in audible output of the loudspeaker as a result. The cross-fader module 111 may include volume and frequency compensation circuitry or logic, such as filters, Fourier transforms, amplifiers, comparators, frequency shifters, expanders, and/or other digital signal processing components. The cross-fader module 111 may comprise a microprocessor, a microcontroller, an ASIC, an FPGA device, a custom integrated circuit, or logic such as algorithms, routines, or programs.

The filter bank 112 may be configured as a bandpass filter, a high-pass filter, a low-pass filter, and/or other filter(s). The filter bank 112 may isolate and process frequency components of the HD radio signal 102 to modify signal characteristics of the HD radio signal 102. The filter bank 112 may increase or decrease the signal bandwidth, and/or increase or decrease the amplitude of determined frequency components of a signal.

The hysteresis module 113 may "lock-in" an analog component of the HD radio signal 102 when a digital component is not detected in the HD radio signal 102. The hysteresis module 113 may provide timing, latch and hold circuitry, or filter components to provide the analog component as an output signal to a loudspeaker. In addition, the hysteresis module 113 may delay transitions to the digital signal component for a determined period of time.

Figure 3:
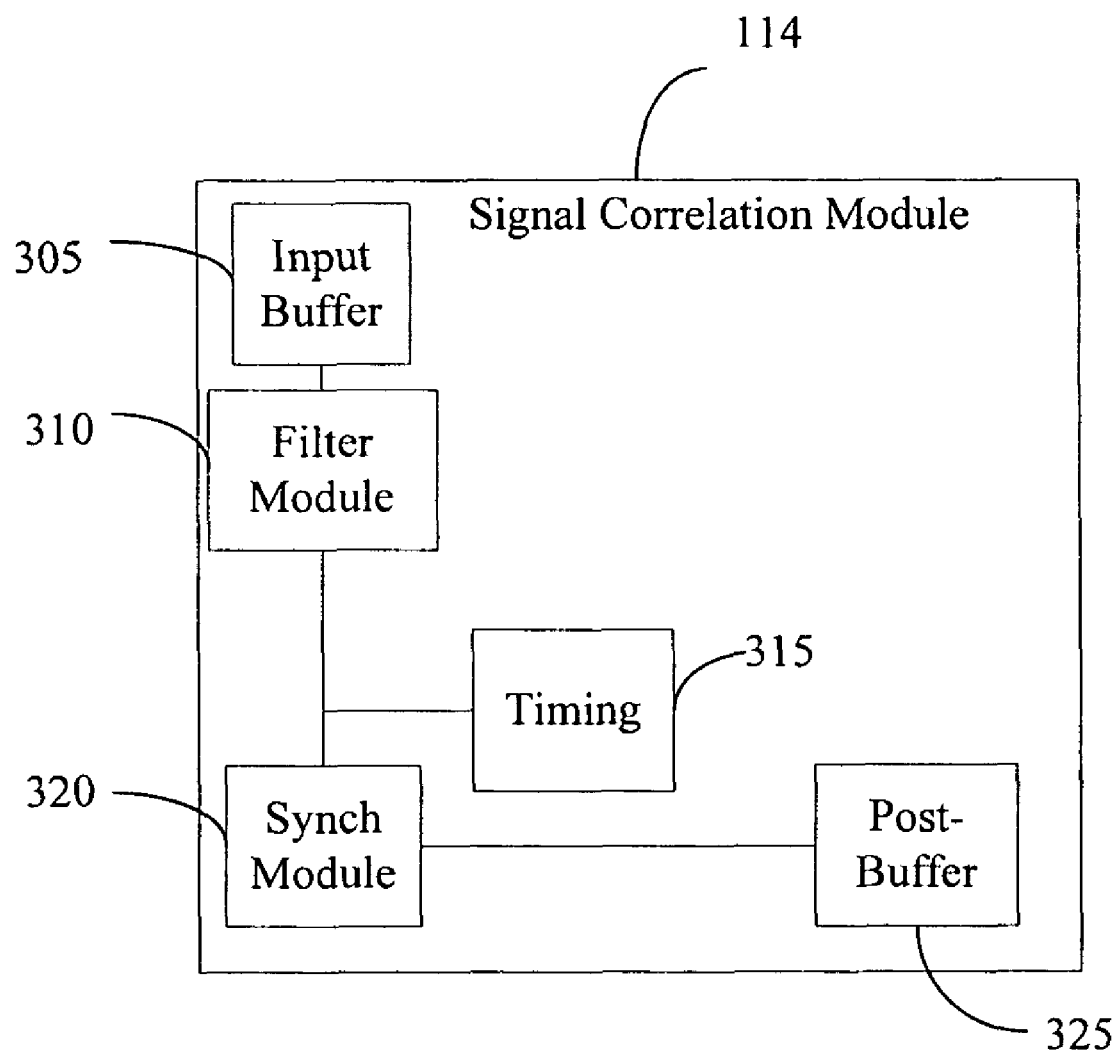
FIG. 3 is a block diagram of an example correlation module included in the radio processor of FIG. 2.

FIG. 3 illustrates a schematic block diagram of an example signal correlation module 114. The signal correlation module 114 may correlate the information, or data, included in the digital and analog signal components, and/or the timing of the digital and analog signal components with respect to each other. The signal correlation module 114 may correlate the information and the timing sequentially or separately to correlate the digital and analog signal components. The use of audio correlation with the signal correlation module 114 may minimize perceived skipping and/or repetition of audio information by only blending between the digital signal component and the analog signal component if the digital signal component retains acceptable quality.

The signal correlation module 114 may include an input buffer 305, configured to store a portion or all of the analog component and/or a portion or all of the digital component, a filter module 310 configured to process the analog component and/or the digital component, a timing module 315, a synchronization module 320, and a post-processing buffer 325 configured to store portions or all of the processed analog component or portions or all of the processed digital component. The synchronization module 320 may comprise a filter (s) and/or signal processing logic to substantially synchronize the content and timing of the HD radio signal components.

The synchronization module 320 may perform a mathematical correlation of the content of the analog signal component of the HD radio signal 102 with the content of the digital signal component of the HD radio signal 102 based on an example correlation function as illustrated in Eqn. 1:

$$Corr_j(A, D) = \sum_{i=-N}^{N} A[i]D[i + j] \quad \text{(Eqn. 1)}$$

$Corr_j$ represents the correlation of an analog signal component A with a digital signal component D, at a point in time j, and i represents a summation variable to be summed over a range from −N to N. The summation range may include other values, as well as non-symmetrical ranges. The correlation value $Corr_j$ may be normalized by the power of the hybrid signal (A*D) such that the normalized correlation value $Corr_j$ may have a maximum value of +/−1. The content included in the analog signal component A and the content included in the digital signal component D may be substantially correlated when the normalized correlation value has a value of approximately +/−1. The correlation module 114 may determine that the contents of the audio signal components are correlated when the normalized correlation value has a value substantially close to a correlation threshold, such as within a certain percentage of one. For example, if the normalized correlation value $Corr_j$ is greater than 0.95, the contents of the audio signal components may be determined to be correlated in the time domain. Other example correlation thresholds may be possible.

The synchronization module 320 also may perform a statistical process to determine if the analog signal component and the digital signal component are correlated in time. The statistical process may use the amplitude and phase information contained in the signal components to determine if the signal components are correlated. The synchronization module 320 also may determine whether the synchronization module 320 needs to perform a time adjustment to account for a time shift between the signal components. Based on analysis of the content and timing, the analog signal component and the digital signal component may contain substantially the same audio information and may be substantially synchronized in time. The synchronization module 320 may comprise a microprocessor, a DSP, a microcontroller, a discrete integrated circuit, a network appliance, an ASIC, an FPGA device, a custom integrated circuit, and/or other electronic circuit device.

The input buffer 305 may comprise storage or a memory device such as volatile or non-volatile memory. The input buffer 305 may include a DRAM, SDRAM, Flash, EEPROM, hard disk drive, or and/other re-writeable media. The input buffer 305 may include partitions for storing the analog signal component and the digital signal component in the different partitions, or the input buffer 305 may be a homogeneous storage. The synchronization module 320 may store portions of the analog signal components and/or the digital signal components of the HD radio signal 102 to allow time and content synchronization between the audio signal components during the correlation process. The post-processing buffer 325 may be configured to allow the synchronization module 320 to perform data operations on the contents of the post-processing buffer 325. Examples of data operations include error checking, data format checks, output timing, or other operations.

The filter module 310 may comprise a bandpass filter or a low-pass filter. The filter module 310 may isolate and/or process frequency components of the HD radio signal 102 to modify the signal characteristics of the HD radio signal 102. The filter module 310 may increase the signal bandwidth, increase or decrease the amplitude of determined frequency components.

The timing module 315 may provide clock and/or timing signals to the synchronization module 320. The clock and timing signals may allow the synchronization module 320 to implement signal correlation operations. The timing module 315 may include clock modules implemented as integrated circuit components.

Figure 4:
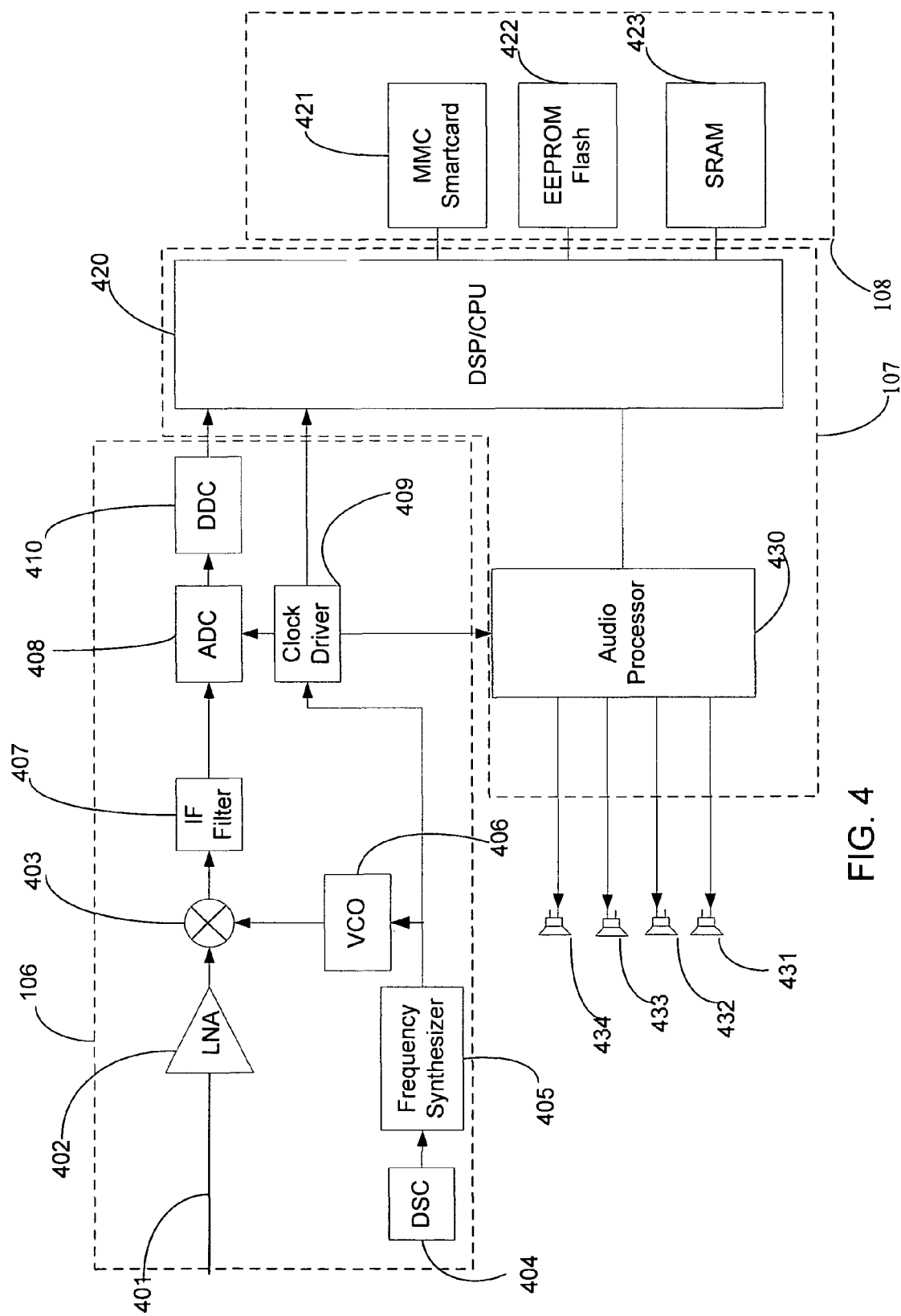
FIG. 4 is a block diagram of the example high definition receiver included in FIG. 1.

FIG. 4 is a more detailed example block diagram of the components of the receiver 105. The tuner 106 may include analog front end components configured to process an input signal 401, such as the HD radio signal 102. A low noise amplifier (LNA) 402 may boost the input signal 401 and supply the output to a mixer 403. A frequency synthesizer 405 may receive a clock signal generated with a digital source clock (DSC) 404, and may provide the clock signal output to a voltage controlled oscillator (VCO) 406 and a clock driver 409. The output of the VCO 406 may be mixed with the output of the LNA 402 at the mixer 403, and then supplied to an intermediate frequency (IF) filter 407. An analog-to-digital converter (ADC) 408 may convert analog radio signals to a digital signal output that is provided to a digital down converter (DDC) 410. The DDC 410 may provide down conversion, digital mixing, and/or decimation filtering to provide baseband in-phase (I) and quadrature (Q) output signals to the processor 107. The processor 107 may include a digital signal processor/central processing unit (DSP/CPU) 420 and an audio processor 430. The ADC 408 may receive a clock output signal from the clock driver 409. The clock driver 409 may also supply the clock signal to the DSP/CPU 420. Any of the components described in FIG. 4 may be implemented by integrated circuit and/or discrete components adapted to process a hybrid digital radio signal.

The DSP/CPU 420 may receive input from the storage 108. The storage 108 may include memory modules, such as a multimedia smartcard (MMC) 421, an EEPROM Flash 422, or an SRAM 423. The MMC Smartcard 421, the EEPROM Flash 422, or the SRAM 423 may provide data, such as digital media, playlists, configuration or initialization parameters, or other data to configure and operate the DSP/CPU 420. The memory modules (421, 422, and 423) may provide source code or other logic executable by the DSP/CPU 420. The DSP/CPU 420 may perform I/Q demodulation and output of a processed digital signal to the audio processor 430. The DSP/CPU 420 may also control the user interface 120 and may also control a bus interface, and/or a network interface (not shown). The DSP/CPU 420 may comprise a DSP, an integrated circuit, an ASIC, an FPGA, a microcontroller, a network appliance, and/or a network server. The functionality of the DSP/CPU 420 may be implemented as computer-readable code or software executable on a processor as previously described.

The audio processor 430 may receive an input(s) from the clock driver 409 in the form of a clock signal. The audio processor 430 may provide an audio output signal that drives one or more audio loudspeakers (431, 432, 433, and 434). The audio processor 430 may be configured to perform the functions described in FIG. 2 in relation to the HD radio module 110, the cross-fader module 111, the filter bank 112, the hysteresis module 113 and/or the signal correlation module 114. Alternatively, the DSP/CPU 420 may perform the functions of the HD radio module 110, the cross-fader module 111, the filter bank 112, the hysteresis module 113 and/or the signal correlation module 114. The audio processor 430 may comprise a DSP, an integrated circuit, an ASIC, an FPGA, a microcontroller, a network appliance, or a network server. The functionality of the audio processor 430 may be implemented as computer-readable code or software stored in a memory device and operable on a processor as previously described.

Figure 5:
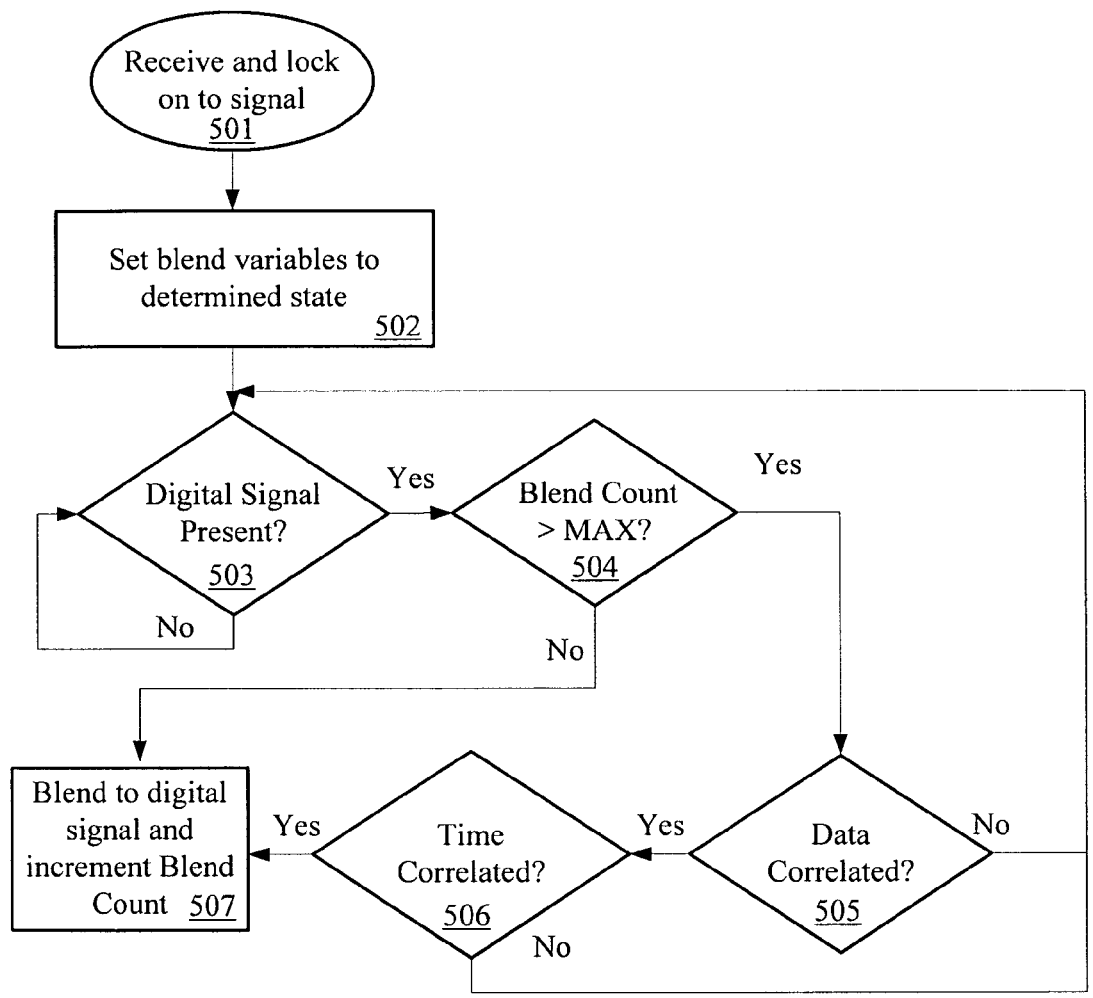
FIG. 5 illustrates an example process that blends a frequency modulation hybrid radio signal.

FIG. 5 illustrates example interrelated acts taken to blend an output from components of a hybrid radio signal. Any of the components of the receiver 105 illustrated in FIGS. 1-4 may perform any of the acts illustrated in FIG. 5. In some systems, an FM radio signal, such as an IBOC frequency modulation (FM) radio signal may be transmitted by transmitter 101. An FM digital radio signal receiver may encounter difficulties maintaining a lock on the digital signal because of varying terrain, building interference, weather conditions, or other ambient spatial and environmental features. Consequently, a receiver may be forced to switch back and forth from an analog component to a digital component of the HD radio signal 102, with resulting changes in loudness or sound quality. The receiver 105 may receive the HD radio signal 102, at block 501. The HD radio signal 102 may include at least one of an analog radio signal or a digital radio signal. The receiver 105 may lock onto the analog radio signal if the analog radio signal is present in the HD radio signal 102, at block 501.

The receiver 105 may initialize blend variables to a determined state, at block 502. The receiver 105 may also set other parameters, such as one or more signal blend count parameters and one or more determined signal blend parameters, such as maximum signal blend count parameters. The signal blend count parameters may represent a number of times that the digital radio signal is blended to the analog radio signal or a number of times that the analog radio signal is blended to the digital radio signal during receiver operation. The maximum signal blend parameters may represent a maximum number of times that the receiver 105 is allowed to blend from the digital radio signal to the analog radio signal, from the analog radio signal to the digital radio signal, or a combination of both blends. A user may desire a smaller number of times that the analog radio signal blends to the digital radio signal when a digital radio signal of varying quality is present. Alternatively, a user may desire a smaller number of times that the digital radio signal blends or switches to the analog radio signal. The receiver 105 may set the blend variables prior to system operation, such as by initializing a memory address, setting a pointer, or filling a cache with blend variable data in a factory setting. The blend variables may be loaded from a memory address. The receiver 105 may also determine the blend variables during system operation, based on operational characteristics and signal reception characteristics, such as signal quality, signal strength, signal frequency characteristics or other parameters. Examples of blend variables include a cross-fade time for fading between signal components, and a blend threshold. The cross-fade time may be set based on an acceptable transition period between the analog and digital components, such as approximately on the order of milliseconds, so that a user does not perceive an abrupt or noticeable transition. A determined state of the blend variables may include a cross-fade time or a blend threshold based on factory-set or user input parameters. The determined blend variables may be stored in the storage 108.

The blend threshold may be determined as a data block error rate when reception conditions for a digital radio signal deteriorate to the point where a determined percentage, such as approximately 10 percent, of the data blocks sent in the digital sidebands of the HD radio signal 102 are corrupted during transmission. Other blend thresholds are possible according to the design and application circumstances. The blend threshold may also be used for blending from an analog radio signal to a digital radio signal. For example, the receiver 105 may determine a data block error rate for the digital radio signal while processing an analog radio signal. The receiver 105 may lock onto and output the digital radio signal on a loudspeaker when the digital radio signal data block error rate decreases below the determined percentage. The blend threshold may be determined by simulations or empirical observations of radio signal blending and signal quality perception. A user may set the blend threshold by interacting with the receiver 105 using the user interface 120. Alternatively, the blend threshold may be automatically determined during system operation, based on system performance or user input.

The receiver 105 may determine if the HD radio signal 102 contains a digital radio signal, at block 503. If the HD radio signal 102 contains a digital radio signal, the receiver 105 determines if the signal blend count parameter is greater than the maximum signal blend count parameter, at block 504. When the receiver 105 blends between the analog radio signal and the digital radio signal a number of times, a listener may experience audio content skipping or repeating of audio content, which may lead to an undesirable listening environment. The receiver 105 may be set initially, or during operation, to allow a maximum number of signal blends, to avoid this undesirable listening environment.

If the signal blend count parameter is greater than the maximum signal blend parameter, the receiver 105 may determine if the data contents of the analog signal component are correlated with the data contents of the digital signal component, at block 505. The receiver 105 may initialize and use the signal correlation module 114 to perform a time-domain correlation between the analog signal component and the digital signal component of the HD radio signal 102. The signal correlation module 114 may also perform mathematical operations to determine a content correlation value, such as by performing Eqn. 1. The output correlation value may be stored in a buffer. The receiver 105 may determine whether the contents of the analog signal component and the contents of the digital signal component are substantially correlated in the time domain, at block 506. The signal correlation module 114 may perform a statistical process to determine whether the analog radio signal component is correlated in time with the digital radio signal component, based on the phase and/or amplitude of the signal components. The receiver 105 may determine a time adjustment that synchronizes the analog radio signal with the digital radio signal, such as a time delay or advance.

If the receiver 105 determines that the analog and digital signal components are not substantially correlated, the process may return to block 503 to determine if a digital signal component exists. If the signal blending count parameter is less than the maximum threshold value, or if the analog and digital signal components are substantially correlated in the time domain and are content-correlated, the receiver 105 may blend a receiver output from the analog signal to the digital signal and increment the signal blend count parameter, at block 507.

The HD radio module 110 may be configured to process the blend line provided by the receiver 105. Blending may be performed by reading the blend line, such as a high to low blend signal transition, with the HD radio module 110 in the receiver 105. The blend line may indicate a starting volume level and an ending volume level for a radio signal component and/or a time period over which a radio signal component is blended to a different radio signal component. For example, when blending from an analog radio signal to a digital radio signal, the blend line may specify how long the blend should take and/or what volume levels the receiver 105 should output the analog radio signal and the digital radio signal during the blend. In some systems, the blend line may indicate a percentage of radio signal component strength or amplitude at determined points during the blend. The blend line may be based on the blend threshold, and the blend line may be transmitted to the HD radio processor 107 when the blend threshold is met by either the digital radio signal or the analog radio signal. The HD radio processor 107 may decide that a determined number of data blocks have been successfully received and processed, indicating the presence of an acceptable digital signal. The HD radio module 110 may process the blend line to initiate the cross-fader module 111 to blend the signal from an analog radio signal to a digital radio signal. The cross-fader module 111 may compensate the signal for volume and frequency parameters to blend the signal, such as by ramping the signal volume as the analog signal is blended to the digital signal, over a fixed time period on the order of milliseconds, or during a determined time period. If the receiver 105 fails to determine that a digital signal is present, the receiver 105 may remain locked to the analog signal in the hybrid radio signal 102, and may continue attempting to acquire a digital signal, at block 503.

Figure 6:
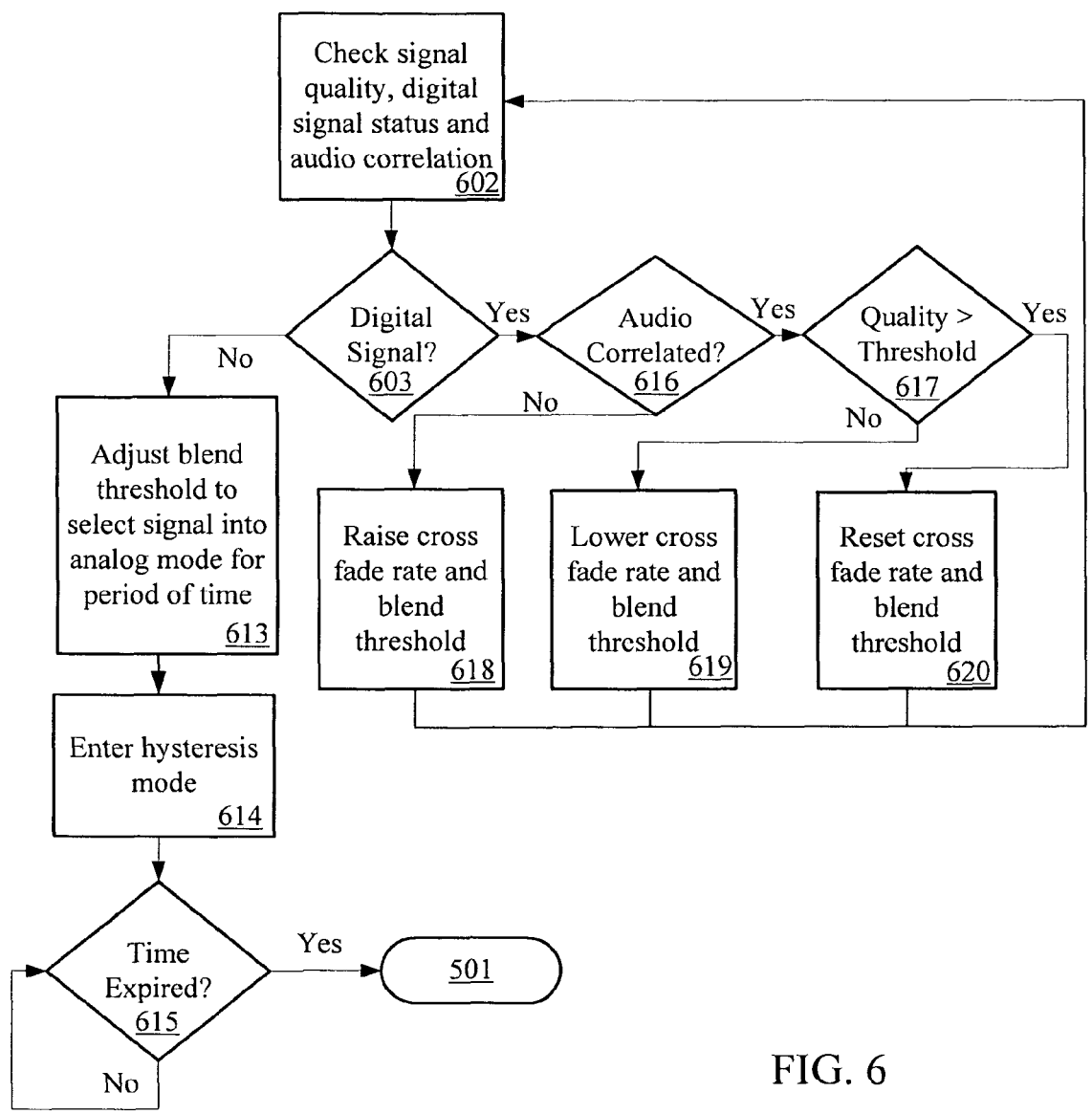
FIG. 6 illustrates an example process that monitors a digital radio signal.

FIG. 6 illustrates example interrelated acts taken to process a hybrid radio signal after blending from an analog radio signal to a digital signal. The receiver 105 may perform a signal quality evaluation, at block 602. The receiver 105 may determine a signal quality of the HD radio signal 102, a digital signal component status, and an audio correlation, such as a data content correlation as illustrated in Eqn. I and/or by a statistical process to determine a time correlation between the analog signal component and the digital signal component. The receiver 105 may determine one or more hybrid digital radio signal quality parameters and one or more digital radio signal quality parameters (if a digital signal is detected at block 503), at block 602. The hybrid radio signal quality parameter and the digital radio signal quality parameter may include parameters from the HD radio module 110, such as status messages indicating the quality or signal integrity of the received radio signals, for example.

The receiver 105 may determine the quality of the digital radio signal within the HD radio signal 102, at block 603. The receiver 105 may process the HD radio signal 102 if the digital radio signal is not of desirable quality, at block 613. The receiver 105 may adjust the blend threshold, at block 613, such as by increasing the determined number of successful data blocks required for digital acquisition. The receiver 105 may set the HD radio signal 102 into an analog mode for a determined period of time. During the analog mode, the receiver 105 outputs only the analog radio signal. The receiver 105 may enter a hysteresis mode using the hysteresis module 113, at block 614. The receiver 105 may remain in analog mode, outputting the analog radio signal, for a determined time period. When in hysteresis mode, the receiver 105 may disable or suspend digital radio signal reception capabilities, maintain the analog radio signal volume and/or frequency settings, and/or filter out digital signal components from the HD radio signal 102. The receiver 105 may not try to determine a digital signal presence until the determined time period expires. After the determined time period expires, the receiver 105 then may return to block 501.

The receiver 105 may monitor the digital radio signal and determine if adjustments to processing parameters are desirable to improve radio output performance. For example, the receiver 105 may determine that the blend threshold may be increased if the digital radio signal has a quality value greater than a threshold value for a determined period of time. Conversely, the receiver 105 may adjust the blend threshold if the digital radio signal decreases in quality value below the threshold for a determined period of time. If the digital radio signal is present in the HD radio signal 102 and of desirable quality, the receiver 105 may determine if the analog signal component and the digital signal component are data correlated and/or time correlated, at block 616. The receiver 105 may monitor the correlation of the digital signal components while the digital signal component meets a determined quality threshold, thereby avoiding skipping or repeating problems from blending between uncorrelated signal components. If the receiver 105 determines that the audio components are correlated, the receiver 105 then may determine if at least one digital radio signal quality parameter is greater than a determined threshold, at block 617. If at least one digital radio signal quality parameter is less than the determined threshold, the receiver 105 may adjust the cross-fade rate and the blend threshold, at block 619, such as by lowering the cross-fade rate and the blend threshold by a determined amount in terms of percentage of maximum value, slew rate or ramp rate, or by absolute value amounts. The determined amount may be set by the system designer, at system installation. The determined amount may also be set by user input, or dynamically adjusted by the receiver 105, based on system operation and signal quality. The receiver 105 then may repeat the radio signal quality checks of block 602 iteratively.

If at least one digital radio signal quality parameter is greater than the determined threshold, at block 617, the receiver 105 may adjust the cross-fade rate and the blend threshold, at block 620, such as by re-setting these variables to default, determined values. If the analog and digital signal components are not correlated, as determined at block 616, the receiver 105 may adjust the cross-fade rate and the blend threshold, at block 618. The receiver 105 may raise these variables by a determined amount in terms of a percentage of maximum value, slew rate or ramp rate, or by absolute value amounts. The receiver 105 may attempt to maintain the digital radio signal as the output signal while the analog radio signal and the digital radio signal are uncorrelated, to avoid or minimize blending. The receiver 105 then may repeat the radio signal quality checks of block 602 iteratively.

If the receiver 105 determines, at blocks 602 and 603 that the digital radio signal is not present or is of a quality that indicates a blend to the analog radio signal is desirable, the receiver 105 may blend the digital radio signal to the analog radio signal. The receiver 105 may use the blend threshold to determine a time period over which to blend the digital radio signal to the analog radio signal and/or volume levels associated with blending the radio signal components. The receiver 105 may use the data block error rate for the digital radio signal to determine when to blend to the analog radio signal. The receiver 105 may also use the data correlation between contents of the digital radio signal and contents of the analog radio signal and/or the time correlation between the radio signal components to determine when to blend to the analog radio signal. In some systems, the user may be prompted using the user interface 120 to select a blend from the digital radio signal to the analog radio signal. The user may be notified audibly using the loudspeakers (431-434) and/or the user may be visually alerted using the first display 121 and/or the second display 122.

Figure 7:
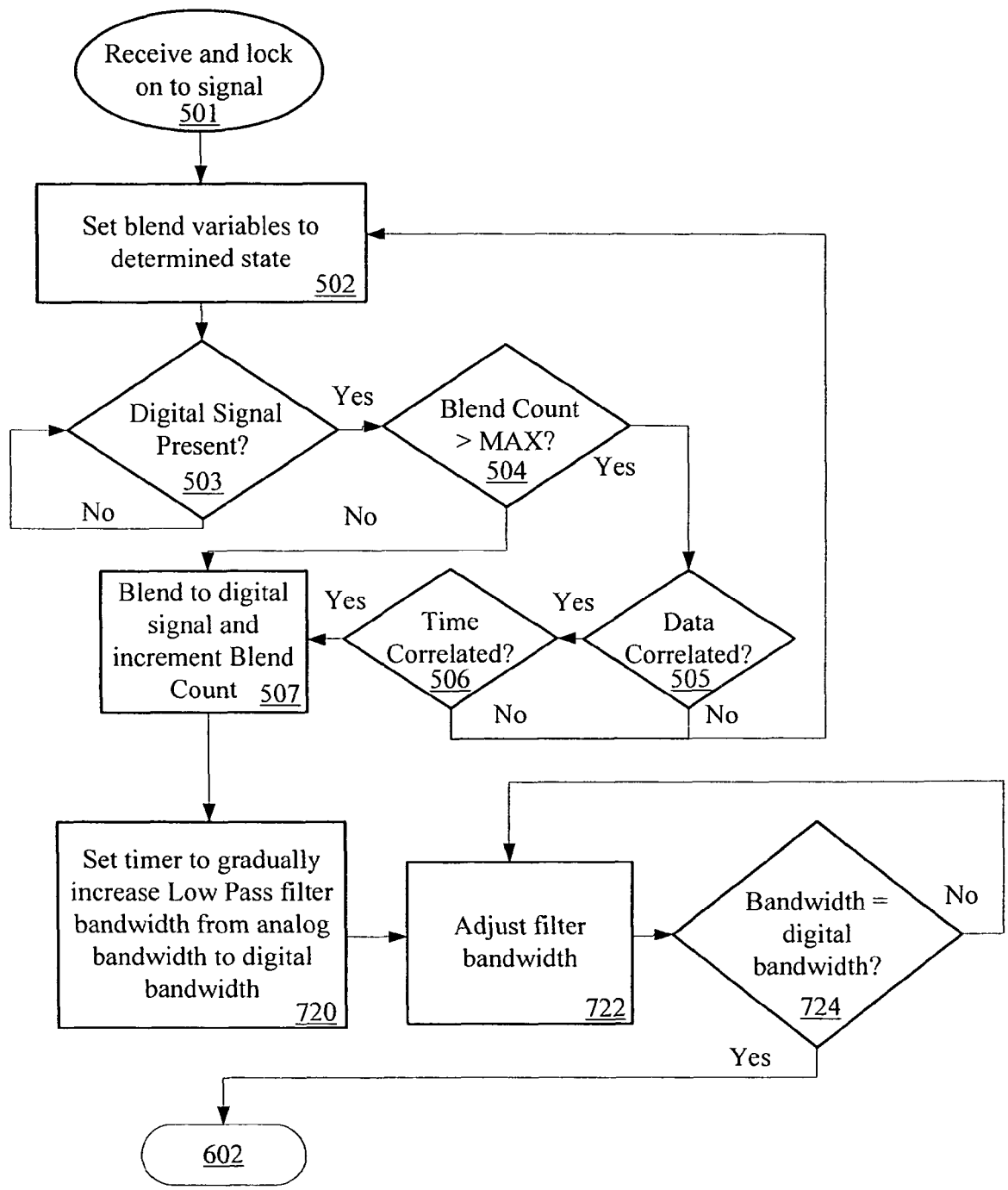
FIG. 7 illustrates an example process that blends an amplitude modulation hybrid radio signal.

FIG. 7 illustrates example interrelated acts that blend output components of a hybrid radio signal, such as IBOC AM radio signal. Any of the components of the receiver 105 illustrated in FIGS. 1-4 may perform any of the acts described in FIG. 7. Digital AM signals may encounter similar problems in signal reception and tuning as FM digital signals. Digital AM signals may experience changes in sound level as a result of blending between an analog AM signal to a digital AM signal, which may be noticeable to the user as an abrupt transition. Digital AM signals also may experience frequency expansion of the signal as well, in which frequency components that were not present in the limited bandwidth analog AM signal are perceived by the user. This may affect the sound quality perceived by the user.

For an AM signal, the receiver 105 may perform the same acts described in FIGS. 5-6 up to block 507. After block 507, when the receiver 105 may blend between an analog AM signal and a digital AM signal, the receiver 105 may set a timer to gradually increase a filter bandwidth for the output signal component from a determined analog bandwidth (such as approximately 5 kHz) to a determined digital bandwidth (such as approximately 15 kHz) over a determined period, such as a few seconds, at block 720. The receiver 105 may adjust the filter bandwidth from the determined analog bandwidth to the determined digital bandwidth, at block 722, using the filter bank 112. The filter may comprise a lowpass filter, for example. In one example, the receiver 105 may increase the filter bandwidth over a 4½ second delay present between the analog and digital signal components of the HD radio signal 102, or may use a shorter or longer time period. The receiver 105 may adjust the filter bandwidth, such as by increasing the filter bandwidth, at block 722, while the timer is incremented. The receiver 105 then may determine if the filter bandwidth is substantially equal to the digital bandwidth, such as within a determined percentage of the digital bandwidth at block 724. The determined percentage may be set to 5% of the digital bandwidth. Other determined percentages may be used. The determined percentage may be set during factory initialization or by the user of the system. If the filter bandwidth is substantially equal to the digital bandwidth, the process may continue with block 602 and may continue with the same process as illustrated in FIG. 6. If the filter bandwidth is not substantially equal to the digital bandwidth, the receiver 105 continues to increase the filter bandwidth, at block 722. The process may continue at block 602 in FIG. 6.

When the receiver 105 blends the AM digital radio signal to the AM analog radio signal, such as when the digital radio signal is no longer present, the receiver 105 may output the analog radio signal using the determined analog bandwidth. In some systems, the receiver 105 blends or switches the digital radio signal to the analog radio signal by adjusting the filter bandwidth of the output radio signal with a process similar to that illustrated in FIG. 7. The receiver 105 may decrease the filter bandwidth of the output signal component until the bandwidth is equal to the determined analog bandwidth. The receiver 105 may buffer a portion of the digital radio signal in the storage 108. The receiver 105 may blend from the stored portion of the digital radio signal to the analog radio signal when the digital radio signal is no longer present in the HD radio signal 102, or when the digital radio signal is no longer of desirable quality.

Figure 8:
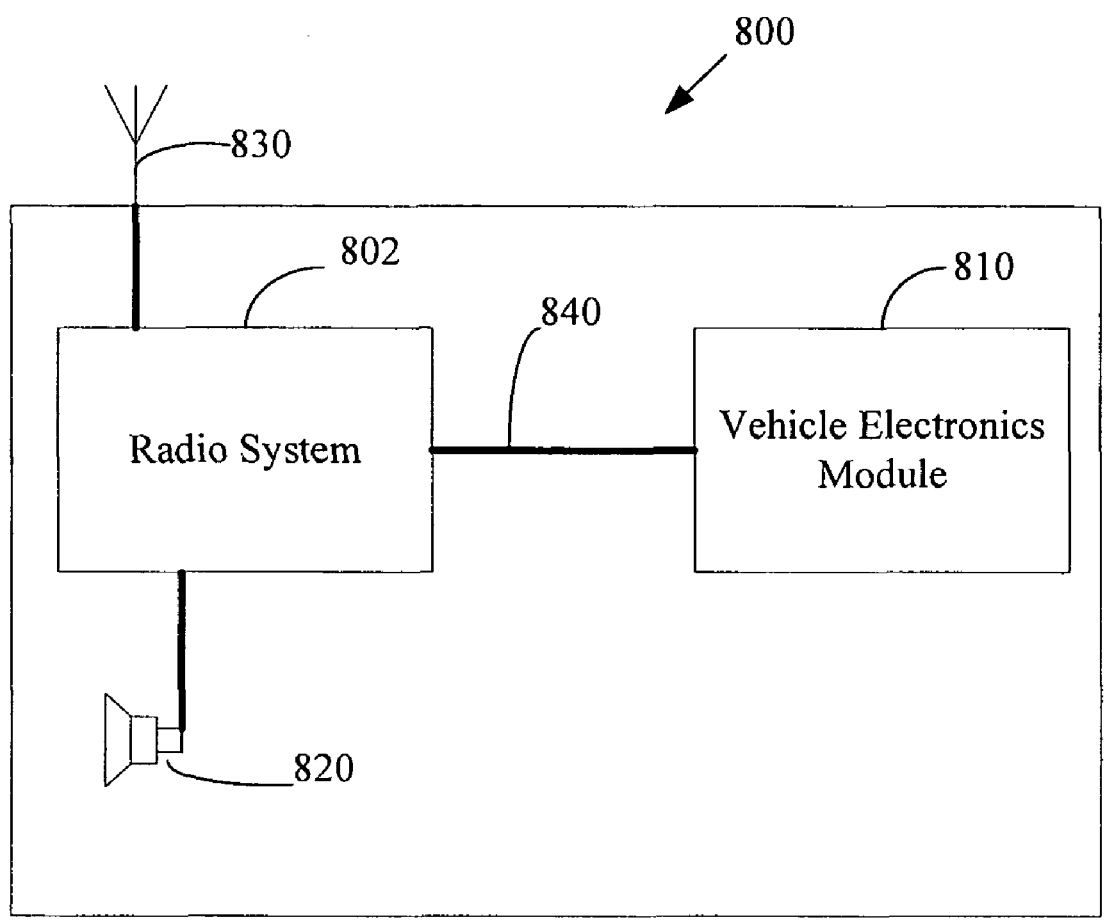
FIG. 8 is a block diagram of an example vehicle information and entertainment system.

The example processes shown in FIGS. 5-7 may be implemented in a vehicle audio system. FIG. 8 illustrates a vehicle entertainment system 800 that may include a radio system 802 such as an HD Radio-configured radio system. The vehicle audio entertainment system 800 may include a vehicle electronics module 810, a loudspeaker system 820, and an antenna 830. The vehicle electronics module 810 may include electronics components for input and output signals, vehicle climate, electronics modules, navigation systems, display and video entertainment modules, audio and video media storage, retrieval and playback systems, and vehicle operation modules. The vehicle electronics module 810 may be interfaced to the radio system 802 through a vehicle system bus 840. The vehicle system bus 840 may be configured to transmit signals between different components in the vehicle. Examples of system bus architecture include Local Interconnect Network (LIN), Controller Area Network (CAN), J1939, ISO11783, FlexRay, Media Oriented Systems Transport (MOST), Keyword Protocol 2000 (KWP2000), Vehicle Area Network (VAN), DC-BUS, IDB-1394, and SMARTwireX.

The HD radio system illustrated in FIG. 1 may be incorporated into a vehicle head unit. The system 100 may also be configured for use in a building, such as a home environment.

The sequence diagrams shown in FIGS. 5-7 may be encoded in a signal bearing medium, a computer readable medium such as a memory device, programmed within a device such as one or more integrated circuits, or processed by a controller or a computer. If the methods are performed by software, the software may reside in a memory device resident to or interfaced to the receiver 105, a communication interface, or any other type of non-volatile or volatile memory interfaced or resident to the receiver 105. The memory device may include an ordered listing of executable instructions for implementing logical functions. A logical function may be implemented through digital circuitry, through source code, through analog circuitry, or through an analog source such as through an analog electrical, audio, or video signal. The software may be embodied in any computer-readable or signal-bearing medium, for use by, or in connection with an instruction executable system, apparatus, or device. Such a system may include a computer-based system, a processor-containing system, or another system that may selectively fetch instructions from an instruction executable system, apparatus, or device that may also execute instructions.

A "computer-readable medium," "machine-readable medium," "propagated-signal" medium, and/or "signal-bearing medium" may comprise any unit that contains, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical connection "electronic" having one or more wires, a portable magnetic or optical disk, a volatile memory such as a Random Access Memory "RAM" (electronic), a Read-Only Memory "ROM" (electronic), an Erasable Programmable Read-Only Memory (EPROM or Flash memory) (electronic), or an optical fiber (optical). A machine-readable medium may also include a tangible medium upon which software is printed, as the software may be electronically stored as an image or in another format (e.g., through an optical scan), then compiled, and/or interpreted or otherwise processed. The processed medium may then be stored in a computer and/or machine memory.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A method for blending a radio signal comprising:
   receiving, with a receiver, a hybrid radio signal that includes an analog radio signal and a digital radio signal;
   determining, with the receiver, absence of the digital radio signal from the hybrid radio signal;
   determining, with the receiver, presence of the digital radio signal in the hybrid radio signal subsequent to the determining absence of the digital radio signal from the hybrid radio signal;
   determining, with the receiver, an audio correlation between the analog radio signal and the digital radio signal in response to the determining presence of the digital radio signal in the hybrid radio signal and in response to a signal blend count parameter being greater than or equal to a determined signal blend parameter;
   blending, with the receiver, from the analog radio signal to the digital radio signal in response to the determining presence of the digital radio signal in the hybrid radio signal and in response to the audio correlation being greater than a predetermined audio correlation threshold or the signal blend count parameter being less than or equal to the determined signal blend parameter; and
   processing, with the receiver, the digital radio signal in response to the determining presence of the digital radio signal in the hybrid radio signal.

2. The method of claim 1 further comprising adjusting, with the receiver, the signal blend count parameter when the signal blend count parameter is about less than or equal to the determined signal blend parameter after blending from the analog radio signal to the digital radio signal.

3. The method of claim 1 where blending, with the receiver, from the analog radio signal to the digital radio signal comprises:
   setting, with a receiver, an analog mode for a predetermined period of time in response to the determining absence of the digital radio signal in the hybrid radio signal;
   suspending, with the receiver, the determining presence of the digital radio signal in the hybrid radio signal for the predetermined amount of time; and
   after the analog mode is set, determining, with the receiver, a digital radio signal quality parameter; and
   processing, with the receiver upon expiration of the predetermined period of time, the digital radio signal in response to the determining presence of the digital radio signal and the digital radio signal quality parameter being greater than or equal to a determined threshold.

4. The method of claim 3 where setting, with the receiver, an analog mode comprises:
   adjusting, with the receiver, a blend threshold;
   determining, with the receiver, if the digital radio signal is present in the hybrid radio signal after the predetermined period of time; and
   blending, with the receiver, to the digital radio signal when the digital radio signal is present after the determined period of time.

5. The method of claim 3 where processing the digital radio signal comprises:
   adjusting, with the receiver, a cross-fade time parameter and a blend threshold when the audio correlation is less than an audio correlation threshold;
   adjusting, with the receiver, the cross-fade time parameter and the blend threshold when the audio correlation is greater than the audio correlation threshold and when the digital radio signal quality parameter is less than or equal to the determined threshold; and
   resetting, with the receiver, the cross-fade time parameter and the blend threshold when the audio correlation is greater than the audio correlation threshold and when the digital radio signal quality parameter is greater than or equal to the determined threshold.

6. The method of claim 5 further comprising executing the method of claim 1 again after setting, with the receiver, the analog mode for the predetermined period of time.

7. The method of claim 1 further comprising:
   locking onto, with the receiver, the analog radio signal; and
   setting, with the receiver, blend variables to a determined state.

8. The method of claim 7 where setting, with the receiver, blend variables comprises setting, with the receiver, a cross-fade time parameter and a blend threshold.

9. The method of claim 1 where the hybrid radio signal comprises a frequency modulation (FM) radio signal.

10. The method of claim 9 where the FM radio signal comprises an in-band on-channel (IBOC) FM radio signal.

11. The method of claim 1 where the hybrid radio signal comprises a high definition radio signal.

12. The method of claim 1 further comprising switching, with the receiver, from the digital radio signal to the analog radio signal when the digital radio signal is no longer present after blending to the digital radio signal.

13. A method for blending a radio signal comprising:
receiving a hybrid radio signal that includes an analog radio signal and a digital radio signal;
determining that the digital radio signal ceases from being present in the hybrid radio signal;
determining presence of the digital radio signal in the hybrid radio signal subsequent to the determining that the digital radio signal ceases from being present in the hybrid radio signal;
determining an audio correlation between the analog radio signal and the digital radio signal in response to the determining presence of the digital radio signal from the hybrid radio signal and in response to a signal blend count parameter being about greater than or equal to a determined signal blend parameter;
blending from the analog radio signal to the digital radio signal in response to the determining the presence of the digital radio signal in the hybrid radio signal and in response to the audio correlation being greater than a predetermined audio correlation threshold, or the signal blend count parameter being about less than or equal to the determined signal blend parameter;
adjusting a filter bandwidth from an analog bandwidth to a digital bandwidth in response to the determining presence of the digital radio signal; and
processing the digital radio signal when the digital radio signal in response to the determining presence of the digital radio signal in the hybrid radio signal.

14. The method of claim 13 further comprising adjusting the signal blend count parameter when the signal blend count parameter is less than or equal to the determined signal blend parameter.

15. The method of claim 13 where blending from the analog radio signal to the digital radio signal comprises:
setting an analog mode for a predetermined period of time in response to the determining that the digital radio signal ceases from being present in the hybrid radio signal;
suspending the determining presence of the digital radio signal in the hybrid radio signal for the predetermined amount of time; and
after the analog mode is set, determining a digital radio signal quality parameter.

16. The method of claim 15 further comprising:
locking onto the analog radio signal during the predetermined period of time; and
setting a plurality of blend variables to respective determined states.

17. The method of claim 16, where setting blend variables comprises setting a cross-fade time parameter and a blend threshold.

18. The method of claim 17 where processing the digital radio signal comprises:
after blending, adjusting the cross-fade time parameter and the blend threshold when the audio correlation is less than the audio correlation threshold with the digital radio signal;
after blending, adjusting the cross-fade time parameter and the blend threshold when the audio correlation is greater than the audio correlation threshold and when the digital radio signal quality parameter is about less than or equal to the determined threshold; and
after blending, resetting the cross-fade time parameter and the blend threshold when the audio correlation is greater than the audio correlation threshold and when the digital radio signal quality parameter is about greater than or equal to the determined threshold.

19. The method of claim 18 further comprising executing the method of claim 13 again after the predetermined period of time if the digital radio signal is not present.

20. The method of claim 15 where processing the digital radio signal comprises:
determining if the digital radio signal is present after the predetermined period of time; and
blending to the digital radio signal in response to the digital radio signal being present and in response to the digital radio signal being present after a the predetermined period of time.

21. The method of claim 13 where adjusting the filter bandwidth comprises:
setting a timer to adjust the filter bandwidth from the analog bandwidth to the digital bandwidth; and
adjusting the filter bandwidth from the analog bandwidth to the digital bandwidth after the timer expires.

22. The method of claim 21 where the filter bandwidth comprises a low pass filter bandwidth.

23. The method of claim 13 where adjusting the filter bandwidth comprises:
determining if the filter bandwidth is within a predetermined percentage of the digital bandwidth; and
increasing the filter bandwidth when the filter bandwidth is not within a predetermined percentage of the digital bandwidth.

24. The method of claim 13 where the hybrid radio signal comprises an amplitude modulation (AM) radio signal.

25. The method of claim 24 where the AM radio signal comprises an in-band on-channel (IBOC) AM radio signal.

26. The method of claim 13 where the hybrid radio signal is a high definition (HD) radio signal.

27. The method of claim 13 further comprising switching from the digital radio signal to the analog radio signal if the digital radio signal is no longer present after blending to the digital radio signal.

28. A system for blending a radio signal comprising:
a receiver operable to receive a hybrid radio signal, where the hybrid radio signal includes an analog radio signal and a digital radio signal; and
a processor operable to execute instructions stored in a memory device to:
determine that the digital radio signal ceases from being present from the hybrid radio signal;
determine presence of the digital radio signal in the hybrid radio signal subsequent to the determination that the digital radio signal ceases to become present in the hybrid radio signal;
determine an audio correlation between the analog radio signal and the digital radio signal in response to the determination of the presence of the digital radio signal in the hybrid radio signal and in response to a signal blend count parameter being about greater than or equal to a determined signal blend parameter;
blend from the analog radio signal to the digital radio signal in response to the determination of the presence of the digital radio signal in the hybrid radio signal and in response to the audio correlation being greater than a predetermined audio correlation threshold or the signal blend count parameter being about less than or equal to the determined signal blend parameter;

set the receiver to an analog mode for a predetermined period of time in response to the determination that the digital radio signal ceases to be present in the hybrid radio signal;

determine a digital radio signal quality parameter; and process, upon expiration of the predetermined period of time, the digital radio signal in response to presence of the digital radio signal the hybrid radio signal.

29. The system of claim 28 where the hybrid radio signal comprises a frequency modulation (FM) radio signal.

30. The system of claim 28 where the processor is further operable to execute instructions to switch from the digital radio signal to the analog radio signal if the digital radio signal ceases to be present after blending to the digital radio signal.

31. A system for blending a radio signal comprising:

a receiver operable to receive a hybrid radio signal where the hybrid radio signal includes an analog radio signal and a digital radio signal; and a processor operable to execute instructions stored in a memory device to:

determine that the digital radio signal ceases from being present from the hybrid radio signal;

determine presence of the digital radio signal in the hybrid radio signal subsequent to the determination that the digital radio signal ceases to become present in the hybrid radio signal;

determine an audio correlation between the analog radio signal and the digital radio signal in response to the determination of the presence of the digital radio signal in the hybrid radio signal and in response to a signal blend count parameter being about greater than or equal to a determined signal blend parameter;

blend from the analog radio signal to the digital radio signal in response to the determination of the presence of the digital radio signal in the hybrid radio signal and in response to the audio correlation being greater than a predetermined audio correlation threshold or the signal blend count parameter being about less than or equal to the determined signal blend parameter;

adjust a filter bandwidth from an analog bandwidth to a digital bandwidth;

set the receiver to an analog mode for a predetermined period of time in response to the determination that the digital radio signal ceases to be present in the hybrid radio signal; and process, upon expiration of the predetermined period of time, in response to presence of the digital radio signal the hybrid radio signal.

32. The system of claim 31 further comprising a filter operatively coupled with the receiver, where the filter is configured to adjust the filter bandwidth.

33. The system of claim 32 where the filter comprises a low-pass filter.

34. The system of claim 33 further comprising instructions stored in the memory device executable by the processor to determine if the filter bandwidth is within a predetermined percentage of the digital bandwidth, where the logic adjusts the filter bandwidth if the filter bandwidth is not within a predetermined percentage of the digital bandwidth.

35. The system of claim 31 where the hybrid radio signal comprises an amplitude modulation (AM) radio signal.

\* \* \* \* \*